(12) United States Patent
Wegener et al.

(10) Patent No.: US 7,578,543 B2
(45) Date of Patent: Aug. 25, 2009

(54) AIR GUIDING DEVICE FOR A MOTOR VEHICLE

(75) Inventors: Fritz Wegener, Gilching (DE); Zsolt Szuecs, Munich (DE)

(73) Assignee: HS Genion GmbH, Krailling (DE)

( * ) Notice: Subject to any disclaimer, the term of this patent is extended or adjusted under 35 U.S.C. 154(b) by 0 days.

(21) Appl. No.: 11/958,505

(22) Filed: Dec. 18, 2007

(65) Prior Publication Data

US 2008/0179915 A1 Jul. 31, 2008

(30) Foreign Application Priority Data

Dec. 18, 2006 (DE) .................. 10 2006 059 724

(51) Int. Cl.
*B62D 35/00* (2006.01)

(52) U.S. Cl. ................ 296/180.5; 296/180.3

(58) Field of Classification Search ........... 296/180.3, 296/180.5; 105/1.3; 180/903; 244/213–216
See application file for complete search history.

(56) References Cited

U.S. PATENT DOCUMENTS

| | | | | |
|---|---|---|---|---|
| 4,810,022 A | * | 3/1989 | Takagi et al. | 296/180.5 |
| 5,120,105 A | * | 6/1992 | Brin et al. | 296/180.5 |
| 5,141,281 A | * | 8/1992 | Eger et al. | 296/180.5 |
| 5,165,751 A | * | 11/1992 | Matsumoto et al. | 296/180.5 |
| 5,735,485 A | * | 4/1998 | Ciprian et al. | 244/113 |
| 6,520,564 B1 | * | 2/2003 | Liang | 296/180.5 |
| 6,805,399 B1 | * | 10/2004 | Brown et al. | 296/180.5 |
| 2002/0125738 A1 | * | 9/2002 | Pettey | 296/180.5 |
| 2004/0256885 A1 | * | 12/2004 | Bui | 296/180.5 |
| 2005/0248182 A1 | * | 11/2005 | Dringenberg et al. | 296/180.5 |
| 2006/0186698 A1 | * | 8/2006 | Roth | 296/180.1 |
| 2008/0036173 A1 | * | 2/2008 | Alguera | 280/407 |
| 2008/0061596 A1 | * | 3/2008 | Brown et al. | 296/180.1 |
| 2008/0093886 A1 | * | 4/2008 | Nusbaum | 296/180.1 |
| 2008/0211261 A1 | * | 9/2008 | Wegener | 296/180.5 |

FOREIGN PATENT DOCUMENTS

| | | | | |
|---|---|---|---|---|
| DE | 4207658 A1 | * | 9/1993 | 296/180.5 |
| DE | 4305115 A1 | * | 8/1994 | 296/180.5 |
| JP | 402006281 A | * | 1/1990 | 296/180.5 |

* cited by examiner

*Primary Examiner*—Jason S Morrow
(74) *Attorney, Agent, or Firm*—Fitch Even Tabin & Flannery; John M. Naber

(57) ABSTRACT

Proposed is an air guiding device for a motor vehicle, comprising a spoiler element (16) which extends substantially in the vehicle transverse direction and which can be moved by means of a setting-out kinematic arrangement, which predefines a movement path, from a retracted rest position into a maximum deployed lifted position. The spoiler element (16) is provided with an adjusting device, by means of which the angle of incidence of the spoiler element (16) with respect to the setting-out kinematic arrangement can be adjusted.

10 Claims, 6 Drawing Sheets

AIR GUIDING DEVICE FOR A MOTOR VEHICLE

This application claims priority from German Patent Application No.: DE 10 2006 059724.9, filed Dec. 18, 2006, the contents of which are herein incorporated by reference.

The invention relates to an air guiding device for a vehicle.

An air guiding device of said type is known for example from DE 10 2004 030 571 A1 and is arranged in the rear region of the motor vehicle below a rear window and serves to improve the road holding of the vehicle in question. As an aerodynamically active component, the air guiding device comprises a spoiler element which extends substantially in the vehicle transverse direction and which can be moved by means of a setting-out kinematic arrangement (i.e., a drive element) from a retracted rest position, in which said spoiler element is for example held in a body depression, into a maximum deployed lifted position, in which said spoiler element is aerodynamically active.

A setting-out kinematic arrangement of a rear spoiler comprises, in a known way, for example linearly movable lifting cylinder or else four-bar mechanisms which are articulatedly connected to the spoiler element at both sides and which predefine the setting-out movement of the spoiler element. In the case of the lifting cylinders which predefine a linear movement, the angle of incidence of the spoiler element with respect to the vehicle body or the lifting cylinders is constant over the entire movement path predefined by the setting-out kinematic arrangement. It is not possible to influence the aerodynamic action of the spoiler element by varying its angle of incidence. When using four-bar mechanisms as a setting-out kinematic arrangement, the angle of incidence of the spoiler element with respect to the vehicle body is predefined by the configuration of the linkages of the four-bar mechanisms. An independent adaptation of the angle of incidence of the spoiler element is not possible.

The invention is based on the object of providing an air guiding device for a vehicle which can, in contrast to the prior art described above, be adapted in an optimum way to the in each case present demands on the aerodynamics of the vehicle in question.

Said object is achieved according to the invention by means of the air guiding device having the features of a spoiler element which extends substantially in the vehicle transverse direction and which can be moved by means of a setting-out kinematic arrangement, which predefines a movement path, from a retracted rest position into a maximum deployed lifted position, characterized in that the spoiler element is provided with an adjusting device, the actuation of which causes the angle of incidence of the spoiler element with respect to the vehicle body to be varied.

The essence of the invention is therefore that of providing an adjusting mechanism by means of which the angle of incidence of the spoiler element with respect to the setting-out kinematic arrangement can be adjusted. The position of the spoiler element or spoiler blade can therefore be varied by means of the adjusting device which is provided in addition to the setting-out kinematic arrangement, and can therefore be adapted to the in each case present demands, so that the aerodynamics and also the driving characteristics of the vehicle in question can be improved by varying the angle of incidence of the spoiler element.

In one specific embodiment of the air guiding device according to the invention, the adjusting device acts so as to adjust the angle of incidence of the spoiler element as a function of the lift of the spoiler element, with said adjusting device being positively controlled by the setting-out kinematic arrangement. A variation of the angle of incidence of the spoiler element with respect to the setting-out kinematic arrangement therefore always takes place when the setting-out kinematic arrangement is actuated.

The setting-out kinematic arrangement for example comprises a linearly-acting drive element, in particular a lifting cylinder, which performs a linear movement in order to set out the spoiler element. Said linear movement is converted by means of positive control into a pivoting movement of the spoiler element. For this purpose, corresponding coupling mechanisms are to be provided. The coupling mechanisms for example comprise a control rod which is articulatedly connected to the spoiler element and which, when the linearly-acting lifting device is actuated, sets the angle of incidence of the spoiler element by interacting with a slotted guide track which is fixed to the body. A coupling mechanism of said type is an embodiment which can be realized in a simple and cost-effective manner.

In one advantageous embodiment of the air guiding device according to the invention, which in particular permits large pivot angles of the spoiler element, the control rod is articulatedly connected with its end remote from the spoiler element to a control lever which is pivotably mounted on the lifting device and comprises a guide element, which is guided in the slotted guide track which is fixed to the body, in order to define its pivoting position.

The slotted guide track which is fixed to the body and which predefines the pivoting movement of the spoiler element and in which the guide element of the control lever is guided is for example designed so as to comprise a lower section which is arranged substantially parallel to the lifting direction of the lifting device and which merges into an adjusting section which is inclined with respect to the lifting direction of the lifting device. When the guide element of the control lever is guided in the lower section, no pivoting movement of the spoiler element takes place. However, once the guide element enters into the adjusting section of the slotted guide track, the control lever is pivoted, so that a pivoting movement is introduced into the spoiler element via the control rod.

In order to be able to secure the maximum pivoted position of the spoiler element with respect to the rest position, or to be able to hold the spoiler element in a locking position, in one advantageous embodiment, that side of the adjusting section which is remote from the lower section is adjoined by an upper section which is aligned parallel to the lifting direction of the lifting device. When the guide element of the control lever is arranged in said upper section, a pivoting of the spoiler element is not possible. The adjusting device is in fact situated in a locking position.

In order to be able to vary the ratio of pivoting movement to lift of the spoiler element, the control rod preferably has an adjustable articulation point on the control lever.

In an alternative embodiment of the air guiding device according to the invention, which is provided with a linearly-acting lifting device for the spoiler element, a guide track which is fixed in terms of lifting direction is provided, in which guide track is guided that end of the control rod which is remote from the spoiler element, with that end which is remote from the spoiler element additionally being guided, during the actuation of the lifting device for setting the angle of incidence of the spoiler element, in the slotted guide track which is fixed to the body. The guide track which is fixed to the lifting device is for example formed on a bearing lug which projects in the radial direction from a lifting cylinder.

In order to be able to adjust the ratio of angle of incidence to lift of the spoiler element in this embodiment also, it is advantageous if an adjustable articulation point of the control rod on the spoiler element is provided.

It is however also conceivable for the setting-out kinematic arrangement to comprise, instead of a linearly-acting lifting device, a four-bar mechanism with two linkages, one of which linkages is driven by means of a drive device and which linkages are in each case articulatedly connected with one end so as to be fixed with respect to the body. In this case, too, it is possible either for positive control for actuating the adjusting device for the angle of incidence of the spoiler element to take place or for a separate drive for actuating the adjusting device to be provided. In the case of positive control, the two linkages can be articulatedly connected with their respective second ends to a coupling element on which the spoiler element is pivotably mounted by means of a steering lever which is connected to a control linkage whose end remote from the steering lever forms a foot point which is fixed to the body. When the four-bar mechanism is actuated, the control linkage therefore exerts a torque on the steering lever, as a result of which the angle of incidence of the spoiler element with respect to the coupling element is varied.

In order to be able to vary the ratio of lift to angle of incidence in this embodiment also, the foot point is preferably designed to be adjustable.

In a further embodiment with a drive kinematic arrangement which is designed as a four-bar mechanism in order to set out the spoiler element, in which a variation, which is independent of the movement of the drive kinematic arrangement, of the angle of incidence of the spoiler element is possible, that end, which is articulatedly connected so as to be fixed with respect to the body, of the non-driven linkage of the four-bar mechanism can be moved by means of a second drive device such that the angle of incidence of the spoiler element is varied in the event of an actuation of the second drive device.

Further advantages and advantageous embodiments of the subject matter of the invention can be gathered from the description, from the drawing and from the patent claims.

Five exemplary embodiments of an air guiding device according to the invention are illustrated in schematically simplified form in the drawing and are explained in more detail in the following description. In the drawing.

Figure 1:
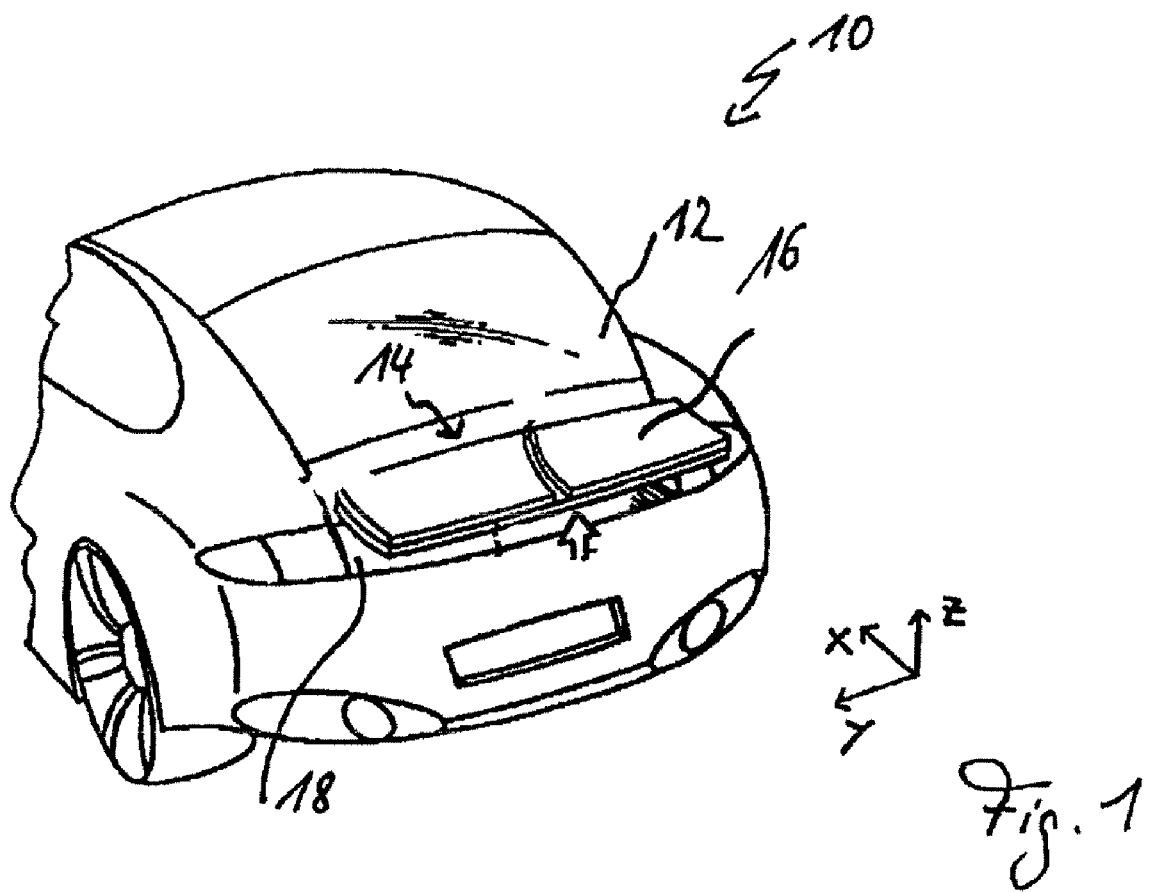
FIG. 1 shows a perspective view of a rear region of a motor vehicle having an air guiding device which has a spoiler element which can be set out.

FIG. 1 illustrates a motor vehicle 10 which has, at the rear side below a rear window 12, an air guiding device which constitutes a rear spoiler. The air guiding device 14 comprises a spoiler blade or element 16 which extends substantially in the vehicle transverse direction and which can be moved, by means of a setting-out kinematic arrangement which is arranged at both sides, between a rest position in which said spoiler blade or element 16 is arranged in a rear-side body depression 18, and a deployed operating position which constitutes an aerodynamically active position.

Figure 2:
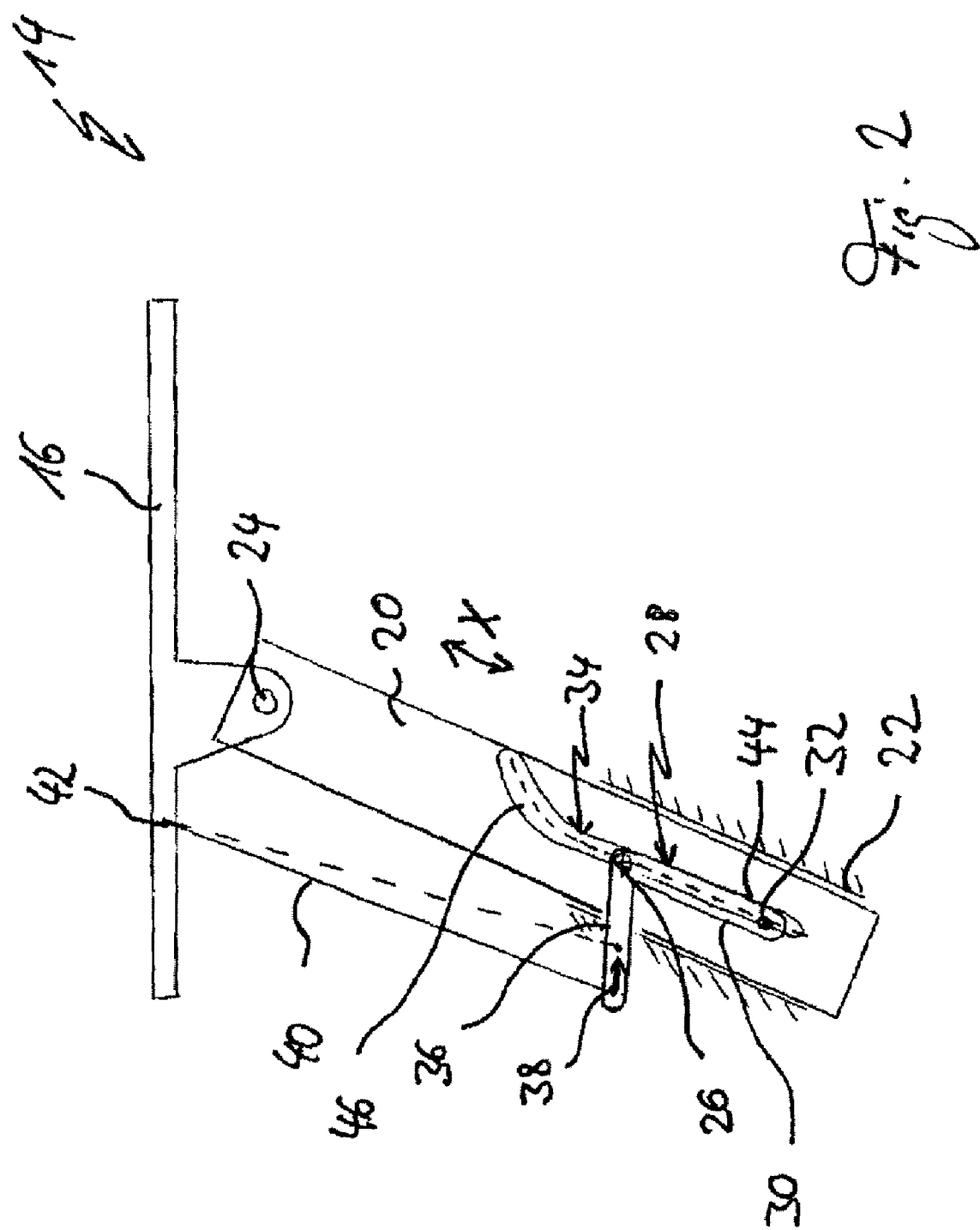
FIG. 2 shows a schematic section through the air guiding device of the vehicle illustrated in FIG. 1.

As can be seen from FIG. 2, the setting-out kinematic arrangement comprises, for deploying the spoiler blade 16, in each case one lifting cylinder 20 at both sides symmetrically with respect to a vehicle longitudinal central plane, which lifting cylinder serves as a linearly-acting lifting device and which can, as per a double arrow X, be moved by means of a hydraulic or electric actuating device (not illustrated) in a guide track 22 which is fixed to the body.

The spoiler element 16 is pivotably articulately connected to the lifting cylinder 20, at the upper end of the latter, by means of a joint 24 whose pivot axis extends in the vehicle transverse direction.

In addition, a control lever 28 which is embodied as an angle bracket is articulatedly connected by means of a joint 26 to the lifting cylinder 20 in a region remote from the joint 24, the one limb 30 of which control lever 28 has, in its end region remote from the joint 26, a guide journal 32 which is guided in a slotted guide track 34 which is fixed to the body. The second limb 36 of the control lever 28 has, in its end region remote from the joint 26, an articulation point 38 (shown in FIGS. 2 and 3), which is adjustable in the direction of the axis of the limb 36, for a control rod 40 which connects the limb 36 of the control lever 28 to the spoiler element 16.

For this purpose, an articulation point 42 is formed on the spoiler element 16.

The slotted guide track 34 has a lower section 44 which is aligned parallel to the movement direction X of the lifting cylinder 20 and which, at the top, merges into a curved adjusting section 46 which is inclined with respect to the movement direction X of the lifting cylinder 20.

The air guiding device 14 illustrated in FIG. 2 operates in the way described below.

Proceeding from the illustrated, lowered rest position of the spoiler element 16, the lifting cylinder 20 is raised as per the movement direction X. Here, the guide journal 32 of the control lever 28 slides firstly in the lower section 44 of the slotted guide 34, with the control lever 28 maintaining its position with respect to the lifting cylinder 20 which constitutes the setting-out kinematic arrangement. Once the guide journal 32, during the lifting movement of the lifting cylinder 20, passes into the adjusting section 46 of the slotted guide track 34, the control lever 28 performs a pivoting movement which is transmitted by means of the control rod 40 to the spoiler element 16, so that in the present case, the spoiler element 16 is also pivoted anticlockwise.

The ratio between the lift and the pivot angle of the spoiler element 16 set by the adjusting section 46 can be varied by means of a variation of the articulation point 38 of the control rod 40 on the limb 36 of the control lever 28.

Figure 3:
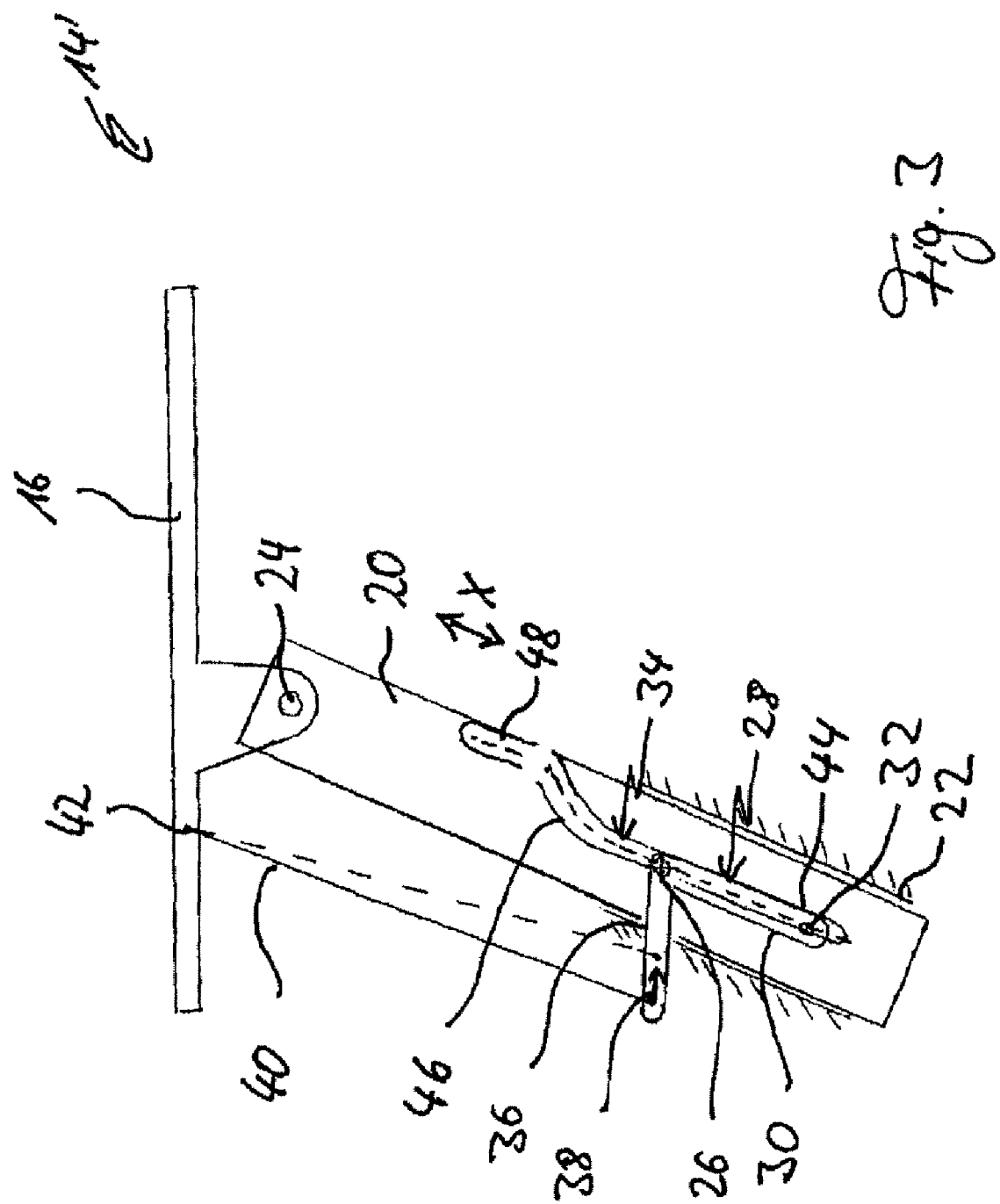
FIG. 3 shows a schematic section through a second embodiment of an air guiding device.

The exemplary embodiment of an air guiding device 14' illustrated in FIG. 3 differs from that as per FIG. 2 merely in that the curved adjusting section 46 of the slotted guide track 34 is adjoined in the upward direction by a locking section 48 which is likewise arranged parallel to the movement direction of the lifting cylinder 20, so that it is possible to obtain that the adjusting device, formed by the control rod 40 and the control lever 28, for the angle of incidence of the spoiler element 16 is locked when the guide journal 32 of the control lever 28 is arranged in the locking section 48. In this way, an inadvertent pivoting of the spoiler element 16 with respect to the lifting cylinder 20 is prevented.

Figure 4:
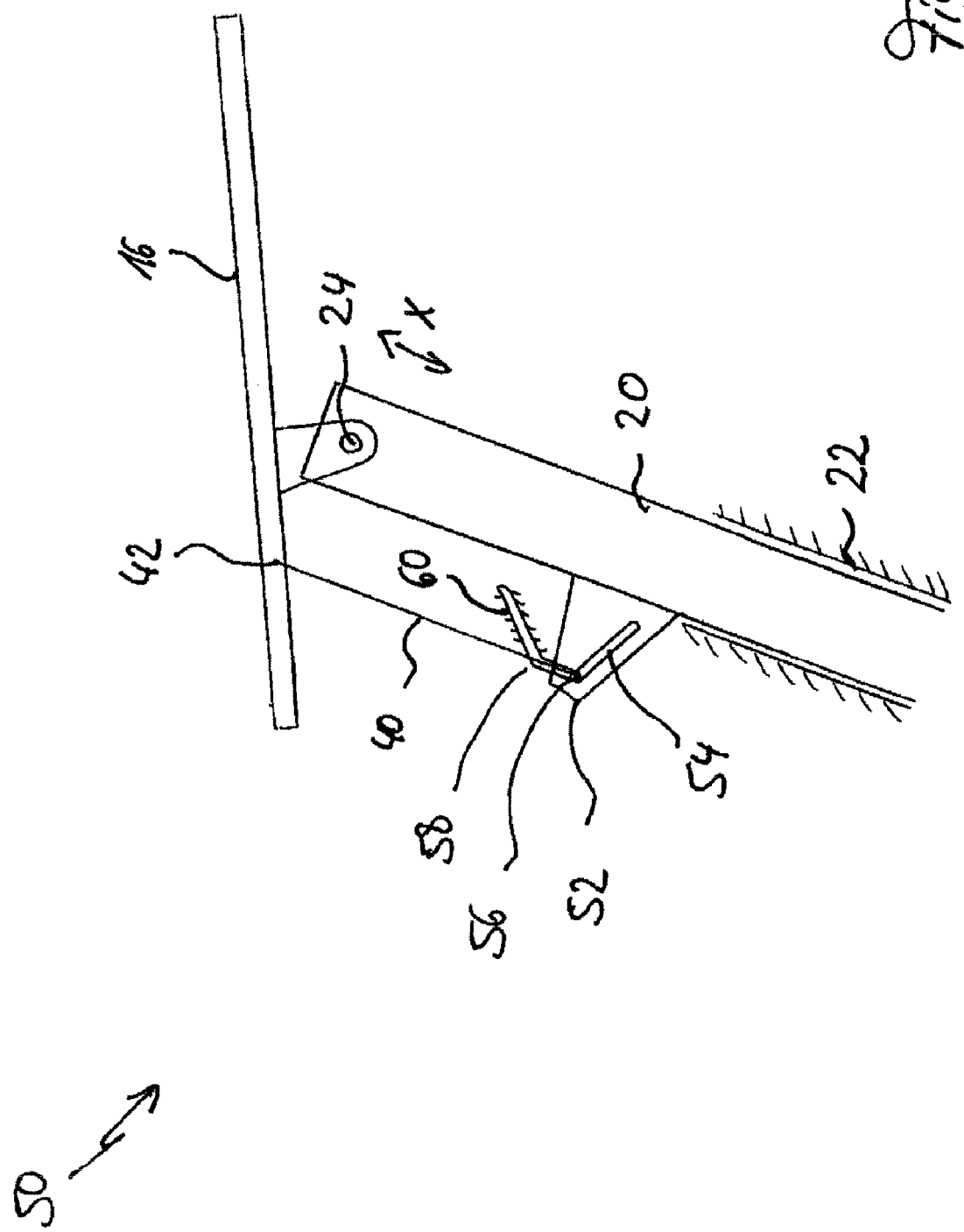
FIG. 4 shows a schematic section through a third embodiment of an air guiding device.

FIG. 4 illustrates an alternative embodiment of an air guiding device 50 which, corresponding to the above-described exemplary embodiments, has a spoiler element 16 which is articulatedly connected by means of a joint 24 to a lifting cylinder 20 which can be moved as per a double arrow X in order to deploy or retract the spoiler element 16. The lifting cylinder 20 has a lug 52 which projects in the radial direction, on which lug 52 is formed a guide track 54 which is fixed to the lifting cylinder and which is inclined with respect to the axis of the lifting cylinder 20. A guide journal 56 is guided in the guide track 54, which guide journal 56 is formed on one end of a control rod 40 which is articulatedly connected, with the end remote from the guide journal 56, to the spoiler element 16 by means of an articulation point 42. The articulation point 42 is variable or adjustable.

In addition, the air guiding device 50 has a slotted guide track 58 which is fixed to the body and which has a lower section which is aligned parallel to the axis and therefore to the movement direction X of the lifting cylinder 20 and which is adjoined in the upward direction by an adjusting region 58 which is inclined with respect to the axis of the lifting cylinder 20 and is aligned so as to run oppositely to the guide track 54. When the lifting cylinder 20 is actuated, the guide journal 56 which is formed on the lower end of the control rod 40 is also guided in the slotted guide track 58, with the guidance in the adjusting region 60 causing a pivoting movement and therefore a change in the angle of incidence of the spoiler element 16.

Figure 5:
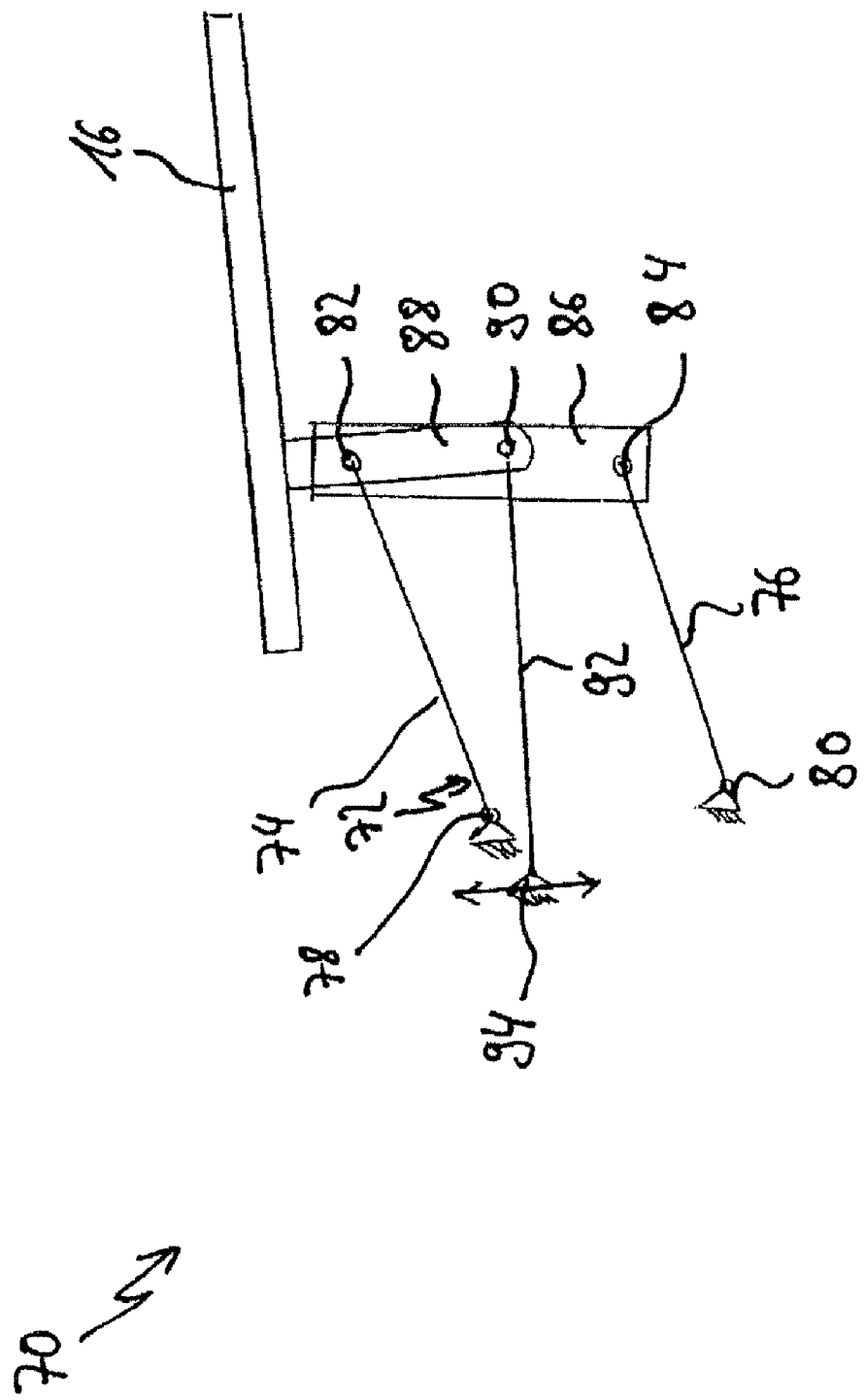
FIG. 5 shows a schematic section through an air guiding device which can be set out by means of a four-bar mechanism.

FIG. 5 illustrates an air guiding device 70 which likewise has a spoiler element 16 which can be moved from a retracted rest position into a deployed lifted position or active position. For this purpose, the air guiding device 70 has a setting-out kinematic arrangement which is formed with a four-bar mechanism 72 which has two linkages 74 and 76 which are in each case articulatedly connected with one end, by means of a joint 78 and 80, so as to be fixed with respect to the body. With their ends remote from the joints 78 and 80, the linkages 74 and 76 are in each case articulatedly connected by means of a joint 82 and 84 to a coupling element 86 on which in turn the spoiler element 16 is pivotably mounted by means of a steering lever 88. The centre of rotation of the linkage 74 and that of the steering lever 88 on the coupling element 86 lie on a common axis.

Fastened by means of a further joint 90 to the end remote from the spoiler element 16 is a control linkage 92 which, with its ends remote from the coupling element 88, forms a foot point 94 which is attached so as to be fixed with respect to the body, which foot point 94 is adjustable in order to vary the ratio of lift to angle of incidence of the spoiler element 16.

The air guiding device 70 operates in the way described below.

Proceeding from a lowered rest position, one of the linkages 74 and 76 of the four-bar mechanism 72 is driven such that the spoiler element 16 is moved into its deployed, active position. Here, the control linkage 92 exerts a force on the steering lever 88, so that the angle of incidence of the spoiler element 16 is varied by pivoting the steering lever 88 about its pivot axis. When retracting the spoiler element 16, in the illustration shown in FIG. 5, the linkages 74 and 76 are pivoted clockwise about the axes of the joints 78 and 80, so that the linkage 92 exerts a tractive movement on the steering lever 88 and the spoiler element 16 is likewise pivoted clockwise.

Figure 6:
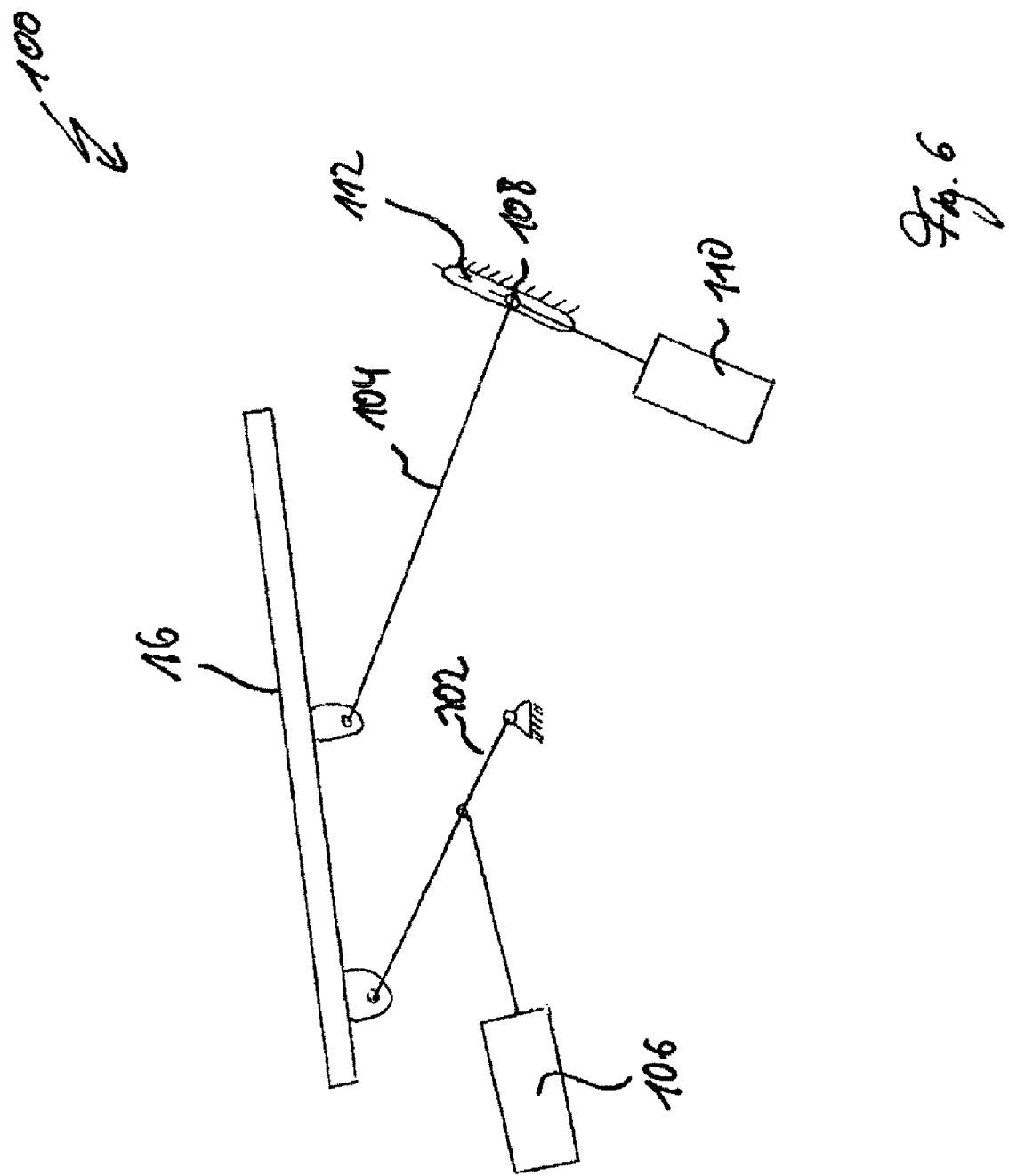
FIG. 6 shows an alternative embodiment of an air guiding device which can be set out by means of a four-bar mechanism.

FIG. 6 illustrates an air guiding device 100 which likewise has a spoiler element 16 which can be pivoted between a lowered rest position and a set-out operating position. As a setting-out kinematic arrangement, the air guiding device 100 likewise has a four-bar mechanism which comprises two linkages 102 and 104 which are in each case articulatedly connected with one end to the spoiler element 16 and are articulatedly connected with their respective other end so as to be fixed with respect to the body.

The linkage 102 is connected to a drive motor 106 which brings about the pivoting movement of the four-bar mechanism and which brings about the setting-out of the spoiler element 16. The articulation point 108, which is fixed with respect to the body, of the non-driven linkage 104 is connected to a second drive motor 110 which can vary the position of the articulation point 108. By moving the articulation point 108 in a guide track 112, the angle of incidence of the spoiler element 16 with respect to the vehicle body, and therefore the aerodynamic action of the spoiler element 16, is varied.

The invention claimed is:

1. An air guiding device for a motor vehicle, comprising a spoiler element which extends substantially in the vehicle transverse direction and which can be moved by means of a drive element, which predefines a movement path, from a retracted rest position into a maximum deployed lifted position, characterized in that the spoiler element is provided with an adjusting device, the actuation of which causes the angle of incidence of the spoiler element with respect to a vehicle body to be varied;

wherein the drive element comprises at least one linearly-acting lifting device, in particular at least one lifting cylinder, which performs a linear movement in order to set out the spoiler element; and wherein a control rod is articulately connected to the spoiler element, which control rod, when the lifting device is actuated, sets the angle of incidence of the spoiler element by interacting with a slotted guide track which is fixed to the body.

2. The air guiding device of claim 1, characterized in that the control rod is articulatedly connected with its end remote the spoiler element to a control lever which is pivotably mounted on the lifting device and comprises a guide element, which is guided in the slotted guide track which is fixed to the body, in order to define a pivoting position.

3. The air guiding device of claim 1, characterized in that the slotted guide track which is fixed to the body and in which a guide element of the control lever is guided comprises a lower section which is aligned substantially parallel to the lifting direction of the lifting device and which merges into an adjusting section which is inclined with respect to the lifting movement of the lifting device.

4. The air guiding device of claim 3, characterized in that that side of the adjusting section which is remote from the lower section is adjoined by an upper section, which is aligned parallel to the movement direction of the lifting device, of the slotted guide track.

5. The air guiding device of claim 2, characterized in that the control rod has an adjustable articulation point on the control lever.

6. The air guiding device of claim 1, characterized in that a second guide track which is fixed in terms of lifting direction is provided, in which guide track is guided that end of the control rod which is remote from the spoiler element, with that end which is remote from the spoiler element, during the actuation of lifting device for setting the angle of incidence of the spoiler element, additionally being guided in the slotted guide track which is fixed to the body.

7. The air guiding device of claim 6, characterized by an adjustable articulation point of the control rod on the spoiler element.

8. The air guiding device of claim 1, characterized in that the drive element comprises at least one four-bar mechanism with two linkages one of which linkages is driven by means of a drive device and which linkages are in each case articulatedly connected with one end so as to be fixed with respect to the body; and characterized in that the two linkages are articulatedly connected with respective second ends to a coupling element on which the spoiler element is pivotably mounted by means of a steering lever which is connected to a control linkage whose end remote from the steering lever forms a foot point which is connected to the body.

9. The air guiding device of claim 8, characterized in that the foot point is adjustably connected to the body.

10. The air guiding device of claim 8, characterized in that that end of the non-driven linkage, which is articulatedly connected to the body, of the four-bar mechanism can be moved by means of a second drive device such that the angle of incidence of the spoiler element is varied.

* * * * *